US010942832B2

(12) United States Patent
Kihneman et al.

(10) Patent No.: US 10,942,832 B2
(45) Date of Patent: Mar. 9, 2021

(54) REAL TIME TELEMETRY MONITORING TOOL

(71) Applicant: MICROSOFT TECHNOLOGY LICENSING, LLC, Redmond, WA (US)

(72) Inventors: Brian Eugene Kihneman, Bellevue, WA (US); Heron Arzaquel Anzures Reyes, Redmond, WA (US); Medhavin Vadhanasindhu, Redmond, WA (US); Siddharth Dahiya, Redmond, WA (US); Dolly Sobhani, Seattle, WA (US); Peter P. Baer, Redmond, WA (US); Ankit Kapur, Redmond, WA (US); Eric Leighton Smith, Duvall, WA (US); Kristopher Wayne Langohr, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/051,411

(22) Filed: Jul. 31, 2018

(65) Prior Publication Data

US 2020/0042418 A1 Feb. 6, 2020

(51) Int. Cl.
*G06F 11/30* (2006.01)
*G06F 11/36* (2006.01)

(52) U.S. Cl.
CPC ...... *G06F 11/3065* (2013.01); *G06F 11/3644* (2013.01); *G06F 11/3668* (2013.01)

(58) Field of Classification Search
USPC ........................................................ 709/224
See application file for complete search history.

(56) References Cited

U.S. PATENT DOCUMENTS 7,469,285 B2 * 12/2008 Poortman ........... G06F 11/3419
709/221
7,680,624 B2 3/2010 McElfresh et al.
(Continued)

FOREIGN PATENT DOCUMENTS

WO 2017168184 A1 10/2017

OTHER PUBLICATIONS

Bullwinkle, et al., "Separating telemetry from Development, Test, and Production", Retrieved from: https://docs.microsoft.com/en-us/azure/application-insights/app-insights-separate-resources, May 15, 2017, 7 Pages.

(Continued)

*Primary Examiner* — Hermon Asres
(74) *Attorney, Agent, or Firm* — Newport IP, LLC; David W. Foster

(57) ABSTRACT

Technologies are disclosed that help developers determine server resource usage caused by client application generated events. Embodiments may be employed while an application is under development to balance the benefit of a given event with an estimated cost to process the event once the application is deployed. One aspect of the present disclosure provides a telemetry application that receives application generated events and estimates a resource cost they cause to data collection servers. The resource cost may be based on historic data captured from similar or related events, as well as data about how often the event and related events are raised by the application.

19 Claims, 6 Drawing Sheets

(56) References Cited

U.S. PATENT DOCUMENTS

| | | |
|---|---|---|
| 8,046,637 B2 | 10/2011 | Gross et al. |
| 10,083,094 B1* | 9/2018 | Thomas .............. G06F 11/1451 |
| 2006/0229777 A1 | 10/2006 | Hudson et al. |
| 2008/0172671 A1* | 7/2008 | Bouillet .............. G06F 11/3447 |
| | | 718/104 |
| 2012/0072776 A1* | 3/2012 | Ng ...................... G06F 11/3688 |
| | | 714/38.1 |
| 2015/0058681 A1* | 2/2015 | Lingannapeta ..... G06F 11/3075 |
| | | 714/47.3 |
| 2016/0224461 A1 | 8/2016 | Araya |
| 2017/0235623 A1 | 8/2017 | Brew et al. |
| 2017/0257303 A1 | 9/2017 | Boyapalle et al. |

OTHER PUBLICATIONS

"International Search Report and Written Opinion Issued in PCT Application No. PCT/US19/038090", dated Sep. 9, 2019, 9 Pages.

* cited by examiner

300

| File | Explore | Tools | Window | Settings | Help | Privacy | | | Telemetry Monitoring Application 106 | | | □ ▣ ✕ |
|------|---------|-------|--------|----------|------|---------|---|---|---|---|---|

| Events 120 | | Trace Log 122 | | Volume 123 | | | |
|---|---|---|---|---|---|---|---|

| Activity Name | Activity ID | Start Time | Duration | Code | Type | Context |
|---|---|---|---|---|---|---|
| - Root | | 4:45:01:820 | 0.000 | | | |
| InitAudienceData | PvRqPD7D0mbURthQ.1 | 4:45:01:824 | 2.450 | 0x00000016 | InitCode | FromBuild: "" ToBuild: "", AudId: "f3260cf", IsLab:"f" |
| AdapterVersionSupported | PvRqPD7D0mbURthQ.2 | 4:45:01:874 | 0.452 | | | InPreferredList: "False", DriverModel:"2" |
| CompositorSessionType | PvRqPD7D0mbURthQ.3 | 4:45:03:449 | 0.385 | | | InPreferredList: "False", DriverModel:"2" |
| - CreateDevice | PvRqPD7D0mbURthQ.4 | 4:45:03:829 | 0.034 | 0x00000003 | Composite | PvRqPD7D0mbURthQ.4 |
| CreateDeviceD3D10 | PvRqPD7D0mbURthQ.4.1 | 4:45:03:943 | 15.236 | | | D3DFeatureLevel: "101", Hardware: "true", HardwareID: "VEN" |

| Time | ThreadID | ActivityID | Category | Severity | Tag | Message |
|---|---|---|---|---|---|---|
| 7/25/2018 4:45:01:820 | 452 | 0 | Experiment Liblet | Warning | b1foe | Caller Queried before Abc is initialized. Returning default value. |
| 7/25/2018 4:45:01:824 | 2450 | 0 | Experiment Liblet | Warning | b1foe | Caller Queried before Abc is initialized. Returning default value. |
| 7/25/2018 4:45:01:874 | 452 | 0 | Experiment Liblet | Warning | b1foe | Caller Queried before Abc is initialized. Returning default value. |
| 7/25/2018 4:45:03:449 | 384 | 0 | Experiment Liblet | Warning | b1foe | Caller Queried before Abc is initialized. Returning default value. |
| 7/25/2018 4:45:03:829 | 384 | 0 | Experiment Liblet | Warning | b1foe | Caller Queried before Abc is initialized. Returning default value. |
| 7/25/2018 4:45:03:943 | 385 | 0 | Experiment Liblet | Warning | b1foe | FontInfoProvider::Release "NumFontFacesInMap":"0"} |
| 7/25/2018 4:45:11:821 | 2450 | 0 | RichEdit | Info | bd48k | IdentityManager is not initialized {} |
| 7/25/2018 4:45:11:824 | 452 | 0 | Identity Authentication Client | Error | bgm51 | [IdentityApi] LogException {"Information":"Injection wrapper into..."} |
| 7/25/2018 4:45:11:874 | 425 | 0 | Identity Exception | Error | a07xq | Inject LicensingDependencies {"Information":"Injection wrapper into..."} |
| 7/25/2018 4:45:13:449 | 452 | 0 | Licensing client liblet | Warning | b1foe | Caller Queried before Abc is initialized. Returning default value. |
| 7/25/2018 4:45:13:829 | 452 | 0 | Licensing client liblet | Warning | b1foe | Caller Queried before Abc is initialized. Returning default value. |
| 7/25/2018 4:45:13:943 | 2350 | 0 | Licensing client liblet | Warning | b1foe | Caller Queried before Abc is initialized. Returning default value. |

302 304 306 308

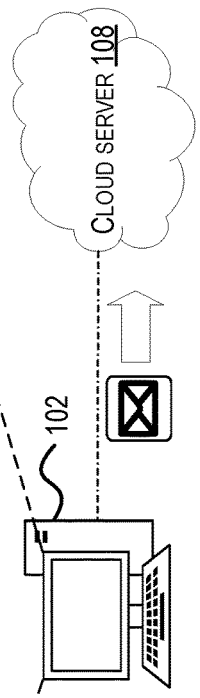

FIGURE 3

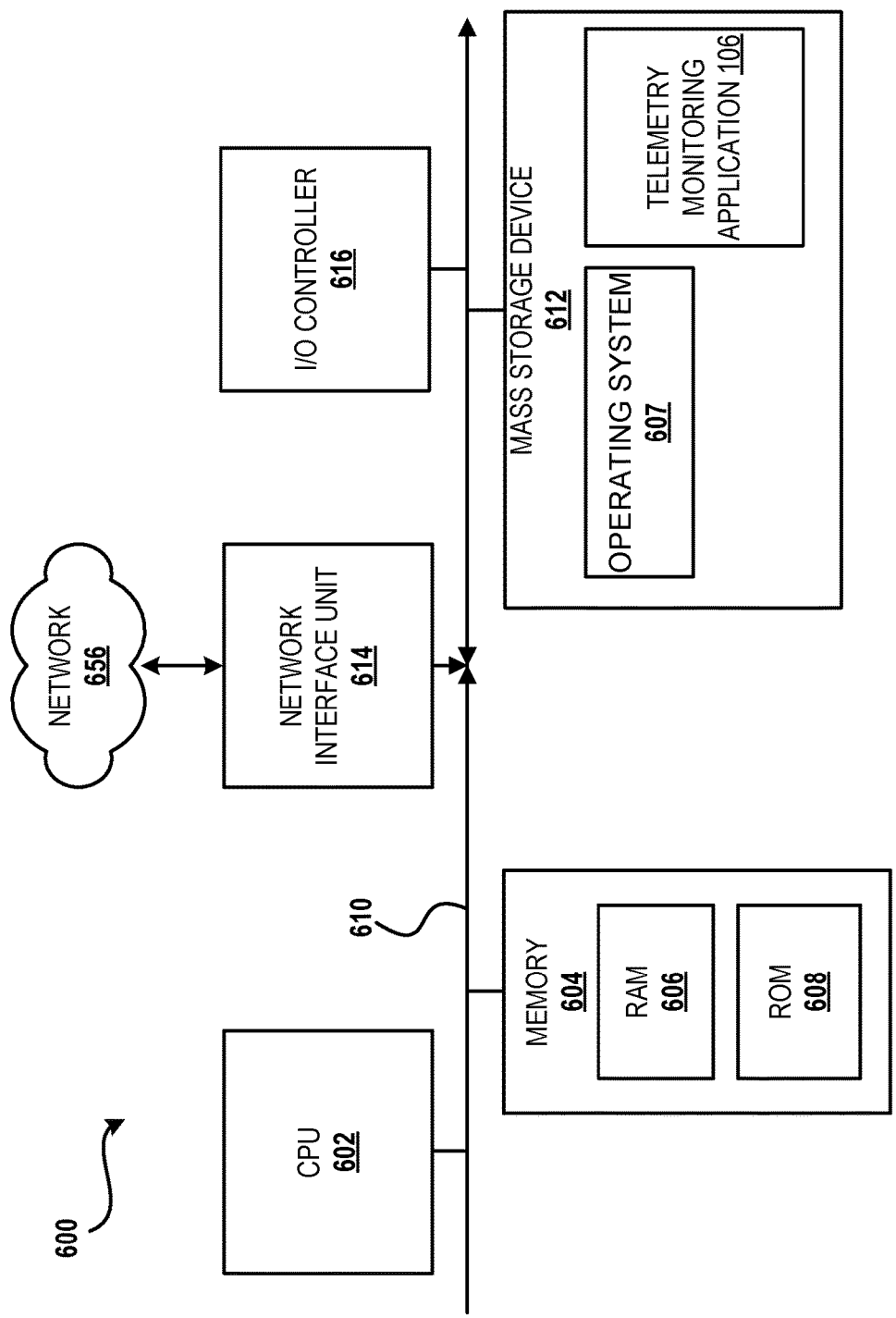

REAL TIME TELEMETRY MONITORING TOOL

BACKGROUND

Software programs are prone to crashes, sluggish performance, feature underutilization, and other problems. To investigate these issues in production environments, developers instrument programs to generate application-level events that report run-time information to a server. For example, an event may report a crash, a code path taken, or some other state of the program.

However, it is hard to know the resource utilization impact on the server caused by receiving, processing, and storing events. Some events may be generated frequently, e.g. from an instrumentation added to a "hot path" of the program. Other events may be generated seldomly, if at all. Developers may make an educated guess as to how frequently an event will be generated for a given instrumentation, but even experts with extensive knowledge of a codebase may not accurately predict event frequencies.

Resource utilization may also be affected by the size of an event and the complexity required to process it. For example, larger events, e.g. events containing a large memory dump, may require significant network and storage resources. Similarly, events that require extensive processing, such as walking a call-stack, may require significant processing and memory resources. Developers may make an educated guess as to an amount of resources required to process a given type of event, but will often over-estimate, under-estimate, or fail to consider one or more types of resources.

These inaccurate predictions can cause an excessive, inefficient use of server computing resources. In some cases, network bandwidth, storage capacity, and processing resources may be consumed for little or no benefit. On the other hand, diagnosing software problems without adequate information provided by events may be inconvenient if not impossible for developers. Given these drawbacks and others, there still exists a need for tools that can balance the benefits of events against the cost in resources to process them.

It is with respect to these and other technical challenges that the disclosure made herein is presented.

SUMMARY

The technologies described herein help developers determine resource usage caused by application generated events. In some embodiments, application generated events serve a diagnostic purpose, such as noting something of interest (e.g. file opened, add-in executed), providing the state of the application when a crash occurred (e.g. memory contents, register contents), providing performance related data (e.g. function invocation counts, function run-times), etc. In some embodiments, events are transmitted to a data collection server, which receives, processes, and stores the events. The data collection server may aggregate events generated by multiple clients, providing a comprehensive view of application utilization, code coverage, frequency and source of crashes, and the like.

A diagnostic program may provide a real-time display of events generated by a local instance of the application. The real-time display may aggregate, list, chart, graph, or otherwise display events and related information. Events may be organized by type, frequency, relationship to other events (e.g. a hierarchy of events, groups of events), etc. For example, a developer may select an event, and choose to view statistics about one or more associated event groups. In some embodiments, events captured from a local instance of the application, e.g. a new version of the application under development, may be displayed side-by-side with historical event data captured from existing deployments of the application.

In some embodiments, historical event data gathered by the data collection server is used to estimate a resource utilization impact of adding or removing events. For example, a developer may want to add an "XML file opened" event, but is unsure about the associated cost of processing "XML file opened" events generated by thousands, millions, or even larger numbers of deployed applications. In some embodiments, an average resource utilization (e.g. an amount of processing, memory, network, storage, or other processing resources) of related events may be presented by the software diagnostic program, e.g. an average resource utilization of a "file opened" event, an "XML file closed" event, or the like. Additionally or alternatively, the diagnostic program may present an average number of times and/or a total number of times a related event has been processed across the deployed applications. The diagnostic program may determine events to be related based on event type (e.g. file open types, message send types), location of the events in the code (e.g. same code path, same function, same module), and the like. By presenting this information, the developer may balance the benefit of additional information from the "XML file opened" events against the cost in resources to gather and process them. For example, as a result of this information, a developer may choose to insert a different event, or choose to relocate the event to a different location within the code. Additionally or alternatively, the diagnostic program may suggest a different event or a different location based on a stated objective of the developer (e.g. increase event information, decrease cost, etc.).

In some embodiments, the diagnostic program is an artificial intelligence ("AI") driven human-computer interface ("HCI") for associating events generated by a locally executing application with historical event data. The associations can be generated by a computing system for use in organizing, retrieving and displaying data in a usable format that improves user interaction with the computing system, e.g. by improving the development and debugging experience.

Among many other technical benefits, the techniques disclosed herein can improve a user's interaction with one or more computing devices. For example, using the disclosed technologies a developer can more quickly diagnose errors in an application. This may improve the function of a computing device as it is used to debug an application.

In some embodiments, by associating events generated by a locally running instance of the application with historical event data, a developer may strategically choose events to include in a final build, drastically reducing the utilization of computing resources like processor cycles, memory, and storage used by servers to process the events. Strategically selecting events also contributes to data minimization, which has additional benefits for limited or costly bandwidth scenarios. Data minimization also has positive environmental impacts by decreasing the amount of energy and other resources used to perform a given computing task.

In addition to improving the efficiency of server computing devices, disclosed embodiments have the secondary effect of improving efficiency and utilization of client computing resources by reducing the number of events sent. This reduces the energy, processing, and network burden on client devices, which can be particularly valuable for mobile devices that are battery powered or that have capped data plans.

It should also be appreciated that the subject matter disclosed herein can be implemented as a computer-controlled apparatus, a computer-implemented method, a computing device, or as an article of manufacture, such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages of prior solutions noted in any part of this disclosure.

BRIEF DESCRIPTION OF THE DRAWINGS

FIG. 3 illustrates aspects of a telemetry monitoring application displaying a trace log.

FIG. 6 is a computer architecture diagram showing an illustrative computer hardware and software architecture for a computing device that can execute the various software components presented herein.

DETAILED DESCRIPTION

Figure 1:
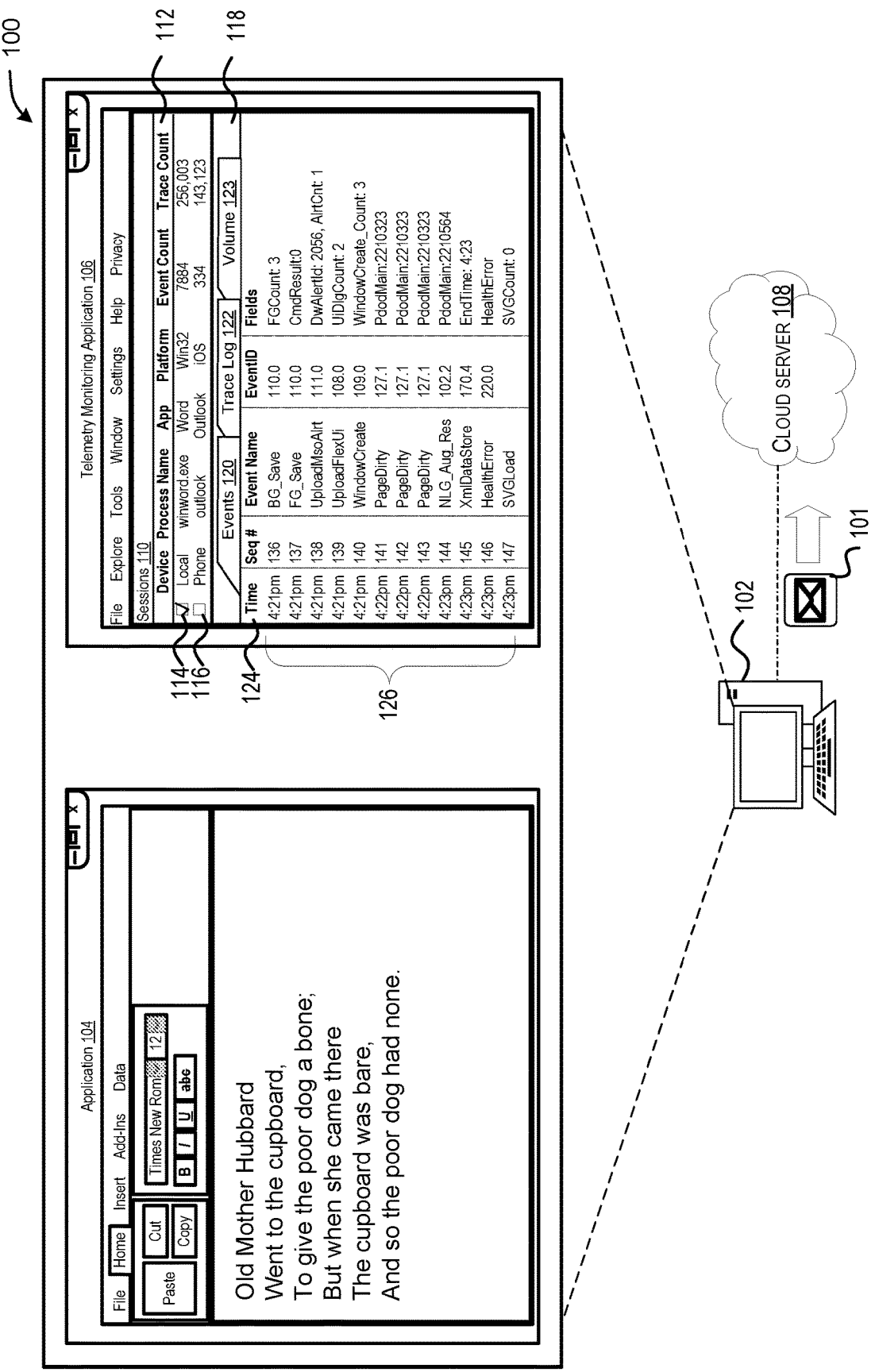
FIG. 1 is a computing system diagram illustrating aspects of a telemetry monitoring application that displays events generated by an application and addressed to a cloud-based data capture server.

The following Detailed Description is directed to technologies that help developers determine server resource usage caused by client application generated events. Embodiments may be employed while an application is under development to balance the benefit of a given event with an estimated cost to process the event once the application is deployed. One aspect of the present disclosure provides a telemetry application that receives application generated events and estimates a resource cost they cause to data collection servers. The resource cost may be based on historic data captured from similar or related events, as well as data about how often the event and related events are raised by the application.

In the following detailed description, references are made to the accompanying drawings that form a part hereof, and which are shown by way of illustration specific configurations or examples. Referring now to the drawings, in which like numerals represent like elements throughout the several FIGS., aspects of a system for providing an AI-driven system for associating low-level content to high level activities using topics as an abstraction will be described.

FIG. 1 is a computing system diagram illustrating aspects of a telemetry monitoring application that displays events, e.g. event 101, generated by an application. Generally described, the system 100 includes computing device 102 running application 104 and telemetry monitoring application 106. A user may interact with telemetry monitoring application 106 to view events, traces, and other information generated by application 104. In some embodiments, the events, traces, and other information are addressed to cloud server 108. Computing device 102 may include a personal computer, tablet, laptop, smart phone, virtual/augmented reality device, or any other type of computing implement. Application 104 may be any type of software, including productivity software, gaming software, multimedia software, financial software, developer tools, etc. Cloud server 108 may include one or more network-enabled computing devices, e.g. server computers. Cloud server 108 may receive events generated by application 104. Events may be generated for the purpose of collecting diagnostic information, usage information, security related information, or any other type of information a software developer, data center manager, or other software professional may want to know about application 104.

In one embodiment, telemetry monitoring application 106 is used by developers of application 104 to investigate, debug, and otherwise view diagnostic information. Telemetry monitoring application 106 may be used at any time during the development process, including coding, testing, deployment, maintenance, etc. For example, a developer may utilize telemetry monitoring application 106 to evaluate a cost associated with inserting an event into application 104.

Telemetry monitoring application 106 may include a session selection interface 110 that lists one or more applications, e.g. applications 114 and 116. A user may select from the list of applications to view the associated events, traces, and other diagnostic information. Attributes 112 of the listed applications are displayed, including for example an indication of which device the application is running on, the process name, the name of the application, and the platform (e.g. operating system) the application is running on. In some embodiments, attributes 112 may include an event count and/or a trace count. An event count indicates how many events have been generated by the application since telemetry monitoring application 106 has been listening. Similarly, the trace count indicates how many activities have been generated since telemetry monitoring application 106 has been listening.

In some embodiments, an event includes data about application 104 that is transmitted to a server, e.g. cloud server 108. As discussed above, events may include any type of information about application 104, including crash data, code coverage data, performance data, usage data, etc. While this information may be useful to developers, data center operators, and the like, there is a resource cost for cloud server 108 to receive, process, and store this information. Computing costs may include network bandwidth, processing usage, storage, memory, etc. Event information is often aggregated from multiple instances of application 104 to provide a big picture of crashes, usage, code coverage, etc., and so cloud server 108 may receive huge numbers of events. For example, if application 104 is deployed to millions of users, the types and numbers of events received by cloud server 108 may be significant, e.g. tens of billions a day.

While events are transmitted to cloud server 108, activities include any piece of data generated by client computing device 102, including events. Activities that are not transmitted to cloud server 108 may be used by developers while developing application 104, or for debugging a deployed instance of application 104.

Telemetry monitoring application 106 may provide a number of user interfaces for viewing events and trace data. For example, tabs 118, including events tab 120, trace log tab 122, and event volume tab 123 may be selected by a user of telemetry monitoring application 106 to view the corresponding interface.

FIG. 1 depicts events tab 120, which includes table 124. Table 124 includes columns such as time, sequence number, event name, event ID, and fields. These columns are exemplary, and more, fewer, or different columns are similarly contemplated. In some embodiments, the time column indicates when an event was generated, the sequence number column indicates the order in which the event was generated, the event name column describes the event, and the event ID includes a number uniquely identifying each event. In some embodiments, the fields column displays an internal schema contained in the event, e.g. attributes, parameters, return values, or other pieces of information deemed useful enough to relay as part of the event. In some embodiments, each of rows 126 of table 124 contain data extracted from an event generated by application 104.

Figure 2:
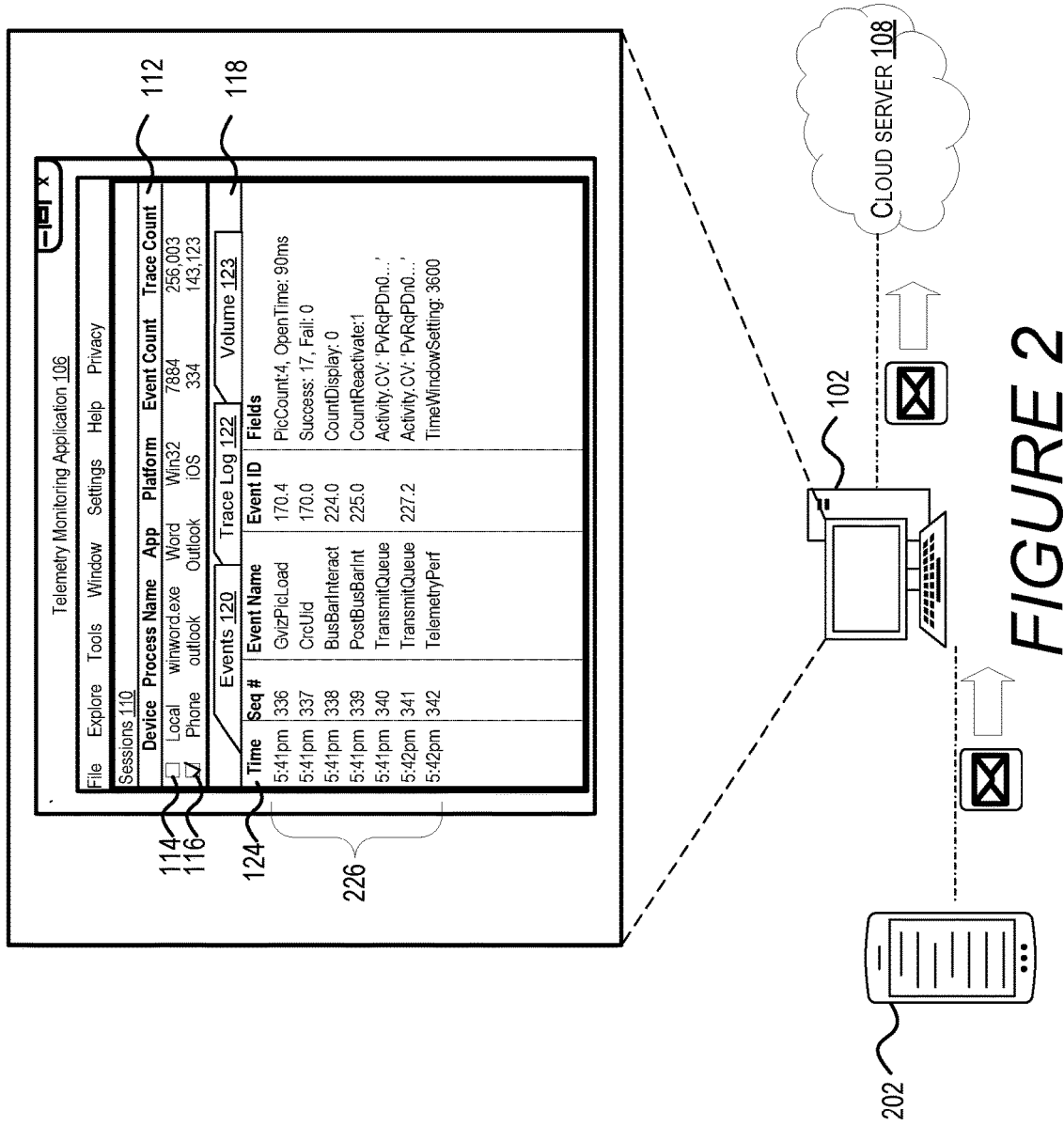
FIG. 2 illustrates aspects of a telemetry monitoring application displaying events generated by an application executing on a different device.

FIG. 2 illustrates aspects of a telemetry monitoring application displaying events generated by an application executing on a different device. The system 200 includes a mobile device 202 sending events and traces to cloud server 108. Mobile device 202 may include a tablet, smart phone, or the like. While FIG. 2 illustrates displaying events generated by a mobile device, events generated by any other type of device may similarly be processed and displayed by computing device 102. For example, telemetry monitoring application 106 may also display events and traces generated from an application executing on a different desktop computer.

In some embodiments, a user may select to view events from mobile device 202 by selecting the checkbox associated with application 116, which has a device of "phone". In some embodiments, mobile device 202 may be configured to transmit events to computing device 102. In other embodiments, telemetry monitoring application 106 intercepts events transmitted from mobile device 202 to cloud server 108. In some embodiments, events are encoded in a platform neutral manner, e.g. JavaScript Object Notation (JSON), eXtensible Markup Language (XML), etc., enabling them to be published and consumed by different platforms (e.g. different operating systems).

FIG. 3 illustrates aspects of a telemetry monitoring application displaying a trace log. The system 300 illustrates telemetry monitoring application 106 as it displays activities. As indicated above, activities are a superset of events transmitted to cloud serve 108. However activities may also include any other type of information made available by application 104, such as debug output.

FIG. 3 depicts trace log tab 122. Trace log tab 122 displays table 302, which depicts a hierarchy of activities, and table 306, which depicts activities related to an activity selected from the hierarchy. In some embodiments, table 302 depicts a hierarchy of activity data beginning at a root node. The root node may be created by application 104 before any other activities are generated, or the root node may be generated by telemetry monitoring application 106. In some embodiments, levels in the hierarchy are depicted by indenting child activity data. For example, "CreateDeviceD3D10" is a child of "CreateDevice", and so the "CreateDeviceD3D10" activity is indented beneath the "CreateDevice" activity. In some embodiments, telemetry monitoring app 106 determines the hierarchy based on ActivityID. For example, related activities may share a first portion of an Activity ID, while distinguishing themselves by having different suffixes. For example, a child activity may have the same ActivityID as its parent, with the addition of a followed by a number. Continuing the example, the activity with ID "PvRqPD7D0mbURthQ.4" is the parent of the activity with ID "PvRqPD7D0mbURthQ.4.1". Additional levels of nesting may be denoted in an activity ID by appending additional '.'s followed by a number.

Table 302, in addition to the activity name and ID, may also depict additional fields, including a start time and a duration of the activity. In some embodiments, the start time indicates when an activity was generated, while the duration indicates how long it took for the activity to complete. Additionally or alternatively, a context field may contain additional, activity-specific data including parameters, return values, or other pieces of data relevant to understand the activity.

In some embodiments, activities may be related in other ways. For example, activities may be related in that they are triggered by the same piece of code (e.g. the same function, the same class, the same module, etc.). Activities may also be related by name, by the thread that executes them, by severity, or the like. Activities also may be related explicitly by software developers. For example, a software developer may assign two activities the same ActivityID, creating a relationship even if none would otherwise exist. In some embodiments, table 306 lists a selected activity and one or more related activities. The activities may be related as indicated above. By displaying activities in a hierarchy and based on other relationships, developers are better equipped to identify trends, patterns, and other insights from the application they are investigating.

Figure 4:
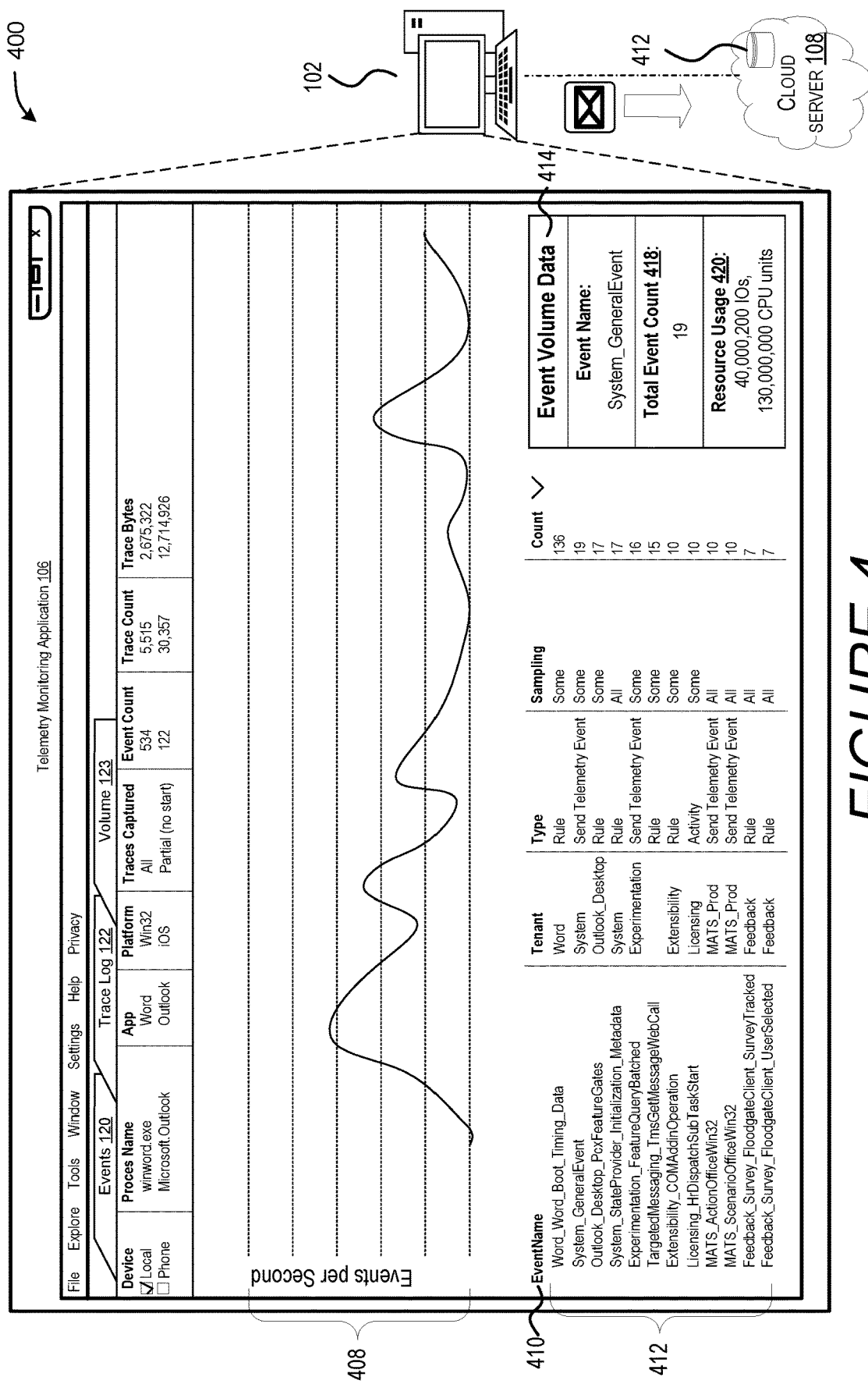
FIG. 4 illustrates aspects of a telemetry monitoring application displaying real-time event volume statistics in addition to predicted resource utilization caused by a given event.

FIG. 4 illustrates aspects of a telemetry monitoring application displaying real-time event volume statistics in addition to predicted resource utilization caused by a selected event. The system 400 includes telemetry monitoring application 106 executing on computing device 102. In some embodiments, event volume tab 123 displays event volume statistics as a graph, e.g. line graph 408, although other types of graphs are similarly contemplated. In some embodiments, telemetry monitoring application 106 counts a number of events generated by application 104 in a defined amount of time, and plots the resulting number on line graph 408. For example, telemetry monitoring application 106 may count how many events were generated each second, and plot the resulting points on line graph 408. In some embodiments, as time progresses, line graph 408 scrolls (e.g. from left to right), removing from view the oldest data to make room for the most recently acquired data.

FIG. 4 also illustrates table 410, which lists events 412. Table 410 may include columns similar to the columns of table 124, with the addition of a sampling column and an event count column. In some embodiments, the 'count' column indicates the number of times an event has been received from application 104. The sampling column indicates whether a particular type of event is transmitted by all clients to cloud server 108, or if only some clients transmit the particular type of event. Some events, such as crash report events, may be deemed important enough that every instance of the event should be transmitted to cloud server 108. Other events, such as a code coverage event, may be just as effective if only a subset of clients transmit them. In some embodiments, subsets of clients may be selected at random, although non-random assignments of subsets are also contemplated. Furthermore, the size of a subset may be set as an absolute value, or as a percentage of deployed applications.

FIG. 4 also illustrates event volume data pane 414, which can list, for a given event, a total event count 418 as well as an estimated server resource usage 420 caused by an event selected from table 410. The estimated server resource usage may be determined by one or more of a variety of factors, and may generate estimates of one or more types. For example, server resource usage caused by a particular event may be estimated based on how frequently the event is generated by application 104 during the current session. In this example, the "System_GeneralEvent" event has been generated 19 times, and so it would be estimated to cause greater server utilization than the "Licensing_HrDispatchSubTaskStart" event, which has occurred 10 times. Server resource usage may also be estimated based on attributes about the event itself, such as the size of the event (which impacts network bandwidth and storage costs), event processing complexity (which impacts processor and memory costs), and the like. Another factor used to estimate server resource utilization is the number of events that will be triggered because a given event is added to application 104.

In some embodiments, resource usage 420 may be estimated based on historical data 412 of related events. In some embodiments, events are determined to be related based on having the same or a similar name. Historical information about related events, such as how many server resources existing deployments of the related event has caused to be consumed, may be used to estimate the resource cost of the received event.

For example, an event received from application 104, e.g. "XMLDocumentOpened" may be matched with data from identically named events generated by existing deployments of application 104. However, similarly named events, such as a "DocumentOpened" event, may also be considered. Events may be deemed similarly named based on having a defined percentage of characters in common, or a defined percentage of characters in a row in common. For example, if an event name has 90% of the characters in common with another event, or 80% of characters in common in a row, the events may be deemed related.

In some embodiments, events are also determined to be related based on having a platform and/or an application in common. For example, events may be deemed in common if they were originated by the same application and the same operating system platform. However, in other embodiments, events with the same name are considered related even if they originated from different platforms and/or different applications. For example, events generated by a word processor running on Windows® may be deemed related to events of the same name (or similar name) generated by a spreadsheet running on Linux®. Events may similarly be deemed related or unrelated based on event version, application version, etc.

In some embodiments, events are determined to be related to events that behave in similar ways. Events may behave in similar ways if they are generated in response to the same action within application 104, or if they are located on the same code path within application 104, for example.

In some embodiments, in addition to or as an alternative to automatically matching received events with historical event data, received events may be used to generate a set of candidate related events to be presented to a user for selection. Candidate related events may be determined using some or all of the metrics discussed above with regard to determining related events, e.g. the same or similar name, common code path, etc. In some embodiments, a user is presented with a dialog containing candidate related events. In some embodiments, statistics correlating the candidate related events to the received event may also be included. A user may then select one or more of the candidate responses, and telemetry monitoring application 106 will include historical data about these events when generating resource usage 420. A user may similarly be presented with options to apply when relating events, such as whether to include events with similar names, events from different applications, events from different platforms, etc. In this way, a user is enabled to customize which historical events are used when estimating a server resource utilization of the received event.

In some embodiments, if an event having the same name is generated by a different application, or by the same application on a different operating system platform, then usage statistics from the other application/platform may be used to estimate the cost of adding the event to application 104. For example, if a spreadsheet application generates a "XMLDocumentOpened" event, and historical data about usage of the "XMLDocumentOpened" event has been captured, the historical data may be included in estimating the resource usage caused by adding an "XMLDocumentOpened" event to a word processor. Similarly, historical data about an "XMLDocumentOpened" event generated by a word processor that runs on a different platform, e.g. MacOS®, may also be used to estimate resources consumed by an "XMLDocumentOpened" event generated by a word processor running on Windows®. Historical data about an event may include a number of times the event was triggered, a percentage of times an event was triggered (e.g. every time the spreadsheet was opened, the "XMLDocumentOpened" event was sent), an average number of resources used to process the event, etc.

In some embodiments, the historical data may be based on events that already exist in application 104, but at a different location in the code. For example, resource usage caused by executing an "XMLDocumentOpened" event at a different code location may be used when generating the estimate. For example, telemetry monitoring application 106 may determine that "XMLDocumentOpened" events use 15 Input/Output (10) units when generated at the different code location, and so the same value would be used to estimate the resource cost of adding another "XMLDocumentOpened" event.

Additionally or alternatively, historical data about event frequency and resource requirements may be augmented by a code path analysis that determines which existing events exist on the same or similar code paths as a newly added event. For example, a code path analysis may determine that a newly added "XMLDocumentOpened" event has been added to a code path that already includes a "DocumentOpened" event. In this case, historical data about the frequency and number of occurrences of the "DocumentOpened" event may be used to estimate the server resource usage caused by adding the "XMLDocumentOpened" event.

Historical data from different sources may also be combined to generate estimated resource usage 420. For example, an event frequency as measured by the same application running on a different platform may be used in conjunction with event processing resource utilization as measured by a different application generating the same event.

Resource usage can also be denoted in a number of ways. In addition to individual resources required, (e.g. network bandwidth, storage, processing, etc.), telemetry monitoring application 106 may estimate a number of additional server computers that could handle the increased load caused by adding an event, a cost in terms of energy consumption, a financial cost, etc.

Figure 5:
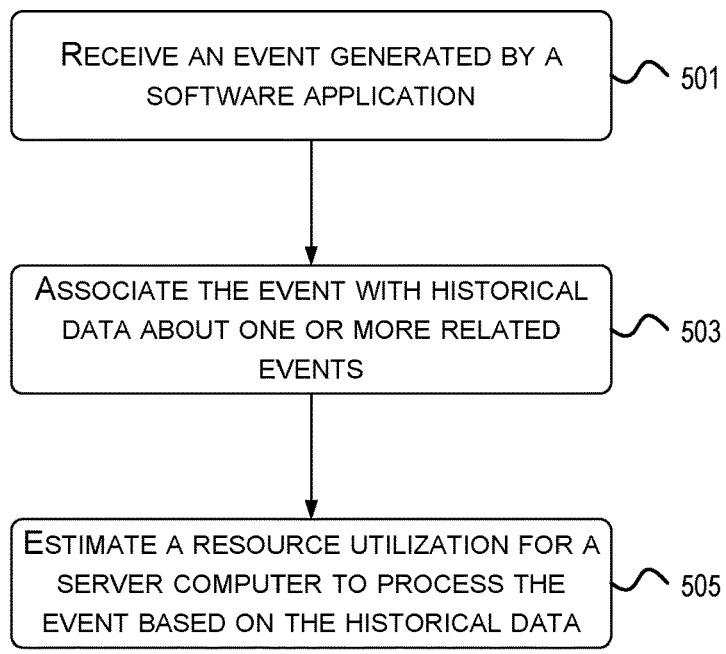
FIG. 5 is a flow diagram illustrating aspects of a routine for estimating server resources utilization to process an event generated by an application that has been deployed to an active user base.

FIG. 5 is a flow diagram illustrating aspects of a routine for estimating server resources utilization to process an event generated by an application that has been deployed to an active user base. It should be appreciated that the logical operations described herein with regard to FIG. 5, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

For example, the operations of the routine 500 can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustration refers to the components of the FIGS., it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, the routine 500 begins at operation 501 where a computing module, such as the telemetry monitoring application 106, receives an application-level event generated by a software application. In some embodiments, the event is addressed to a data collection server device, and as such causes resource utilization of networking infrastructure and the data collection server device. In some embodiments, the telemetry monitoring application 106 is executing on the same computing device as the software application 104 transmitting the event, although events may also be received from software applications executing on other devices.

From operation 501, the routine 500 proceeds to operation 503, where a correlation is made between the received event and historical data derived from one or more related events. In some embodiments the correlation is based on the received event and the related events having the same or similar name, a shared attributed within a defined threshold, or existing in the same code path. The shared attribute may include, for example, a frequency per session, an event memory footprint, or the like. In some embodiments, the correlation is based in part on whether instrumentation code generating the event was executing in response to a user initiated action, or whether the instrumentation code generating the event was executed automatically by the software, not in response to user initiated interaction.

In some embodiments, historical data may be generated by internal test users. In these embodiments, when the historical data is not generated by an installed user base, historical data may be considered a relative measure—i.e. resource costs may be meaningful relative to each other, but do not represent the resource cost once the application is deployed to end users. As such, resource utilization estimates may be scaled based on a ratio of average resource use by the installed user base to the average resource use by internal test users. For example, if the average event is raised 10 billion times a day by the installed user base, but internal testers cause the event to be raised 1 million times a day, the estimated resource utilization of a new event, when based on historical data from internal testers, could be multiplied by 10,000 to estimate the cost when finally deployed. Additionally or alternatively, historical data may be generated by running automation scripts.

From operation 503, the routine 500 proceeds to operation 505, where a resource utilization for the server computer to process the event is estimated. In some embodiments, estimating the resource utilization for the server computer to process the event includes estimating the resource utilization for events generated by an installed user base. In some embodiments, the estimation is based on historical data derived from associated events. For example, the estimation may be based on a frequency that a related event is raised by the installed user base.

In some embodiments, the resource utilization is estimated by extrapolating from one or more known variables. For example, if a relative frequency of an event is known based on historical data, but the event is different in some way (e.g. memory footprint, required computing complexity, etc.), telemetry monitoring application 106 may extrapolate server resource utilization by accounting for the difference(s) in the events. For example, if the historical events are smaller, the estimated resource utilization may extrapolate a larger number based on the received event being larger, and therefore requiring more resources.

In other embodiments, when a resource utilization of a given event is known, but it is estimated that the received event will be generated more (or less) than the historical events, telemetry monitoring application 106 may extrapolate by accounting for the difference in expected event frequency.

In some embodiments, the look-back of historical data is limited to ensure that recent, and therefore more relevant, historical data is used. For example, historical data collected in the previous 4 weeks may be utilized. Similarly, the generated estimate of resource utilization may be qualified as a prediction for a defined amount of time in the future, e.g. 2 weeks.

Upon the conclusion of operation 505, the routine 500 can terminate.

FIG. 6 shows additional details of an example computer architecture 600 for a computer, such as a computing device executing application 102 (FIG. 1), capable of executing the program components described herein. Thus, the computer architecture 600 illustrated in FIG. 6 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, and one or more application programs such as telemetry monitoring application 106.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

The disclosure presented herein also encompasses the subject matter set forth in the following examples:

EXAMPLE 1

A computer-implemented method, comprising: receiving an event (101) from a software application (104) executing on a client device (102), wherein the event (101) includes information about the software application captured during execution of the software application; correlating the event (101) with historical data (412) about one or more related events; and estimating a resource utilization (420) for a server computer (108) to process the event (101) based on the historical data (412) about the one or more related events.

EXAMPLE 2

The computer-implemented method of Example 1, wherein the correlating is based on correlating a name of the event and a name of the one or more related events.

EXAMPLE 3

The computer-implemented method of Example 1, wherein the correlating is based on the event and the related event having a shared attribute within a defined threshold.

EXAMPLE 4

The computer-implemented method of Example 3, wherein the shared attribute include includes a frequency of event occurrence or an event memory footprint.

EXAMPLE 5

The computer-implemented method of Example 1, wherein the correlating is based on the event and the one or more related events being caused within a same code path.

EXAMPLE 6

The computer-implemented method of Example 5, wherein the code path includes instrumentation code embedded within the software application, and wherein the instrumentation code is executed in response to a user initiated action.

EXAMPLE 7

The computer-implemented method of Example 5, wherein the code path includes instrumentation code embedded within the software application, and wherein the instrumentation code is executed automatically by the software application.

EXAMPLE 8

The computing-implemented method of Example 1, wherein the information includes performance data, crash data, or code coverage data.

EXAMPLE 9

A computing system, comprising: one or more processors; and a computer storage medium having computer-executable instructions stored thereupon which, when executed by the one or more processors, cause the computing system to: receive an event at a telemetry modeling tool from a software application, wherein the event includes information about the software application captured during execution of the software application, and wherein the telemetry modeling tool is executing on a different platform than the software application; correlate the event with historical data about one or more related events; and estimate a resource utilization for a server computer to process the event based on the historical data about the one or more related events.

EXAMPLE 10

The computing system of Example 9, wherein estimating the resource utilization for the server computer includes extrapolating the actual resource utilizations of the one or more related events based on the event having different memory footprint.

EXAMPLE 11

The computing system of Example 9, wherein estimating the resource utilization for the server computer includes extrapolating the actual resource utilizations of the one or more related events based on the event having a different frequency of execution.

EXAMPLE 12

The computing system of Example 9, wherein estimating the resource utilization for the server computer is based in part on averaging a resource utilization of the related events and estimating a frequency that the event will be raised by the software application.

EXAMPLE 13

The computing system of Example 12, wherein the event is executed on a code path, and wherein estimating the frequency that the event will be generated by the software application is based in part on determining a frequency of execution of the one or more related events that are also on the code path.

EXAMPLE 14

A computer storage medium having computer-executable instructions stored thereupon which, when executed by one or more processors of a computing system, cause the computing system to: receive an event at a telemetry modeling tool from a software application, wherein the event includes information about the software application captured during execution of the software application, and wherein the telemetry modeling tool is executing on a different platform than the software application; correlate the event with historical data about one or more related events; and estimate a resource utilization for a server computer to process the event based on the historical data about the one or more related events.

EXAMPLE 15

The computer storage medium of Example 14, wherein the one or more related events are refined based on a user selection of proposed related events.

EXAMPLE 16

The computer storage medium of Example 14, wherein the historical data is gathered by the server computer from a plurality of client computers.

EXAMPLE 17

The computer storage medium of Example 16, wherein the event is included in different types of applications, and wherein the historical data is gathered from different types of applications executing on the plurality of client computers.

EXAMPLE 18

The computer storage medium of Example 17, wherein the plurality of client computers are executing on different operating systems.

EXAMPLE 19

The computer storage medium of Example 14, wherein the historical data includes information captured in a first amount of time prior to the event, and wherein the estimate applies for a second amount of time after the event.

EXAMPLE 20

The computer storage medium of Example 19, wherein the first amount of time includes a month and the second amount of time includes two weeks.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
   receiving an instance of an event generated by a first version of a software application;
   identifying one or more events that are related to the event, wherein instances of the one or more related events were generated by a plurality of instances of a second version of the software application, wherein instances of the one or more related events have been processed by a server computer, and wherein the second version of the software application is different than the first version of the software application;
   retrieving a measure of resource utilization for the server computer attributed to processing instances of the one or more related events; and
   estimating a resource utilization for the server computer to process instances of the event received from a plurality of deployments of the first version of the software application based in part on:
   the measure of resource utilization of the server computer attributed to processing instances of the one or more related events and
   an estimate of a frequency of the instances of the event generated by the plurality of deployments of the first version of the software application.

2. The computer-implemented method of claim 1, wherein identifying the one or more related events is based on correlating a name of the event and a name of the one or more related events.

3. The computer-implemented method of claim 1, wherein identifying the one or more related events is based on the event and the one or more related events having a shared attribute within a defined threshold.

4. The computer-implemented method of claim 3, wherein the shared attribute includes a frequency of event occurrence or an event memory footprint.

5. The computer-implemented method of claim 1, wherein identifying the one or more related events is based on the event and the one or more related events being caused within a same code path.

6. The computer-implemented method of claim 5, wherein the code path includes instrumentation code embedded within the software application, and wherein the instrumentation code is executed in response to a user initiated action.

7. The computer-implemented method of claim 5, wherein the code path includes instrumentation code embedded within the software application, and wherein the instrumentation code is executed automatically by the software application.

8. The computing-implemented method of claim 1, wherein the event includes performance data, crash data, or code coverage data.

9. A computing system, comprising:
   one or more processors; and
   a computer storage medium having computer-executable instructions stored thereupon which, when executed by the one or more processors, cause the computing system to:
   receive an instance of an event generated by a first version of a software application;
   identify one or more events that are related to the event, wherein instances of the one or more related events were generated by a plurality of instances of a second version of the software application, wherein instances of the one or more related events have been processed by a server computer, and wherein the second version of the software application is different than the first version of the software application;

retrieve a measure of resource utilization of the server computer attributed to processing instances of the one or more related events; and estimate a resource utilization for the server computer to process instances of the event received from a plurality of deployments of the first version of the software application based in part on:

the measure of resource utilization of the server computer attributed to processing instances of the one or more related events and an estimate of a frequency of the instances of the event generated by the plurality of deployments of the first version of the software application.

10. The computing system of claim 9, wherein estimating the resource utilization for the server computer to process instances of the event includes extrapolating from the resource utilization of the server computer when processing instances of the one or more related events based on the event having a different memory footprint than the one or more related events.

11. The computing system of claim 9, wherein estimating the resource utilization for the server computer to process instances of the event is based in part on averaging a resource utilization of the server computer when processing instances of the one or more related events and estimating a frequency that the event will be raised by the first version of the software application.

12. The computing system of claim 11, wherein the event is executed on a code path, and wherein estimating the frequency that instances of the event will be generated by first version of the software application is based in part on determining a frequency of execution of the one or more related events that are also on the code path.

13. A computer storage medium having computer-executable instructions stored thereupon which, when executed by one or more processors of a computing system, cause the computing system to:

receive an instance of an event generated by a first version of a software application;

identify one or more events that are related to the event, wherein instances of the one or more related events were generated by a plurality of instances of a second version of the software application, wherein instances of the one or more related events have been processed by a server computer, and wherein the second version of the software application is different than the first version of the software application;

retrieve a measure of resource utilization of the server computer attributed to processing instances of the one or more related events; and estimate a resource utilization for the server computer to process instances of the event received from a plurality of deployments of the first version of the software application based in part on:

the measure of resource utilization of the server computer attributed to processing instances of the one or more related events and an estimate of a frequency of the instances of the event generated by the plurality of deployments of the first version of the software application.

14. The computer storage medium of claim 13, wherein the resource utilization is estimated based on a subset of the one or more related events, and wherein the subset of the one or more related events is selected based on a user selection of related events.

15. The computer storage medium of claim 13, wherein the instances the one or more related events are gathered by the server computer from a plurality of client computers.

16. The computer storage medium of claim 13, wherein instances of the one or more related events are received from deployed instances of different applications.

17. The computer storage medium of claim 15, wherein the plurality of client computers are executing different operating systems.

18. The computer storage medium of claim 13, wherein the instances of the plurality of related events were captured over a first amount of time prior to receiving the instance of the event, and wherein the estimate of the resource utilization applies for a second amount of time after receiving the instance of the event.

19. The computer storage medium of claim 18, wherein the first amount of time includes a month and the second amount of time includes two weeks.

* * * * *